(12) United States Patent
Sarwari

(10) Patent No.: US 10,298,815 B1
(45) Date of Patent: May 21, 2019

(54) CHASSIS AND MOUNTING ARRANGEMENT FOR A PANORAMIC CAMERA

(71) Applicant: Altia Systems, Inc., Cupertino, CA (US)

(72) Inventor: Atif Sarwari, Saratoga, CA (US)

(73) Assignee: Altia Systems, Inc., Cupertino, CA (US)

( * ) Notice: Subject to any disclaimer, the term of this patent is extended or adjusted under 35 U.S.C. 154(b) by 332 days.

(21) Appl. No.: 14/058,131

(22) Filed: Oct. 18, 2013

Related U.S. Application Data

(60) Provisional application No. 61/715,762, filed on Oct. 18, 2012.

(51) Int. Cl.
*H04N 5/225* (2006.01)
*H04N 5/232* (2006.01)

(52) U.S. Cl.
CPC ....... *H04N 5/2252* (2013.01); *H04N 5/23238* (2013.01)

(58) Field of Classification Search
None
See application file for complete search history.

(56) References Cited

U.S. PATENT DOCUMENTS

| 5,400,073 | A  | * | 3/1995  | Morioka    | H04N 5/2253 348/335  |
|-----------|----|---|---------|------------|----------------------|
| 2001/0047583 | A1 | * | 12/2001 | Van Den Aker | H01R 43/205 29/747 |
| 2006/0055821 | A1 | * | 3/2006  | Sousa      | G03B 29/00 348/375   |
| 2007/0075818 | A1 | * | 4/2007  | Hansen     | H01F 38/14 336/200   |
| 2007/0206945 | A1 | * | 9/2007  | DeLorme    | G03B 41/00 396/332   |
| 2008/0298674 | A1 | * | 12/2008 | Baker      | G06K 9/209 382/154   |
| 2010/0245661 | A1 | * | 9/2010  | Kim        | H05K 3/301 348/374   |
| 2011/0234764 | A1 | * | 9/2011  | Ichimura   | H04N 13/0239 348/47  |
| 2011/0242408 | A1 | * | 10/2011 | Hsieh      | G03B 17/12 348/374   |
| 2011/0249100 | A1 | * | 10/2011 | Jayaram    | H04N 5/2253 348/48   |

* cited by examiner

*Primary Examiner* — Twyler L Haskins
*Assistant Examiner* — Quan Pham
(74) *Attorney, Agent, or Firm* — HM Law Group LLP; Vani Moodley, Esq.

(57) ABSTRACT

A method for mounting an imaging sensor to a chassis is disclosed. The method comprises forming a plurality of mounting formations on a body of the chassis: forming a plurality of sensor sub-assemblies, each comprising a sensor mounted to a cartridge block; and securing each sensor sub-assembly to the chassis via a corresponding mounting formation.

12 Claims, 6 Drawing Sheets

CHASSIS AND MOUNTING ARRANGEMENT FOR A PANORAMIC CAMERA

This application claims the benefit of priority to U.S. Provisional Patent Application No. 61/715,762, which was filed on Oct. 18, 2012, the entire specification of which is incorporated herein by reference.

FIELD

Embodiments of the present invention relate to a chassis and a mounting arrangement for a panoramic camera.

BACKGROUND

A panoramic camera may be used to capture a panoramic view of a scene. In order to produce the panoramic view, a panoramic camera may comprise a single imager/sensor or multiple imagers/sensors. The spatial distance or separation of the multiple separate sensors within the panoramic camera has to be separated by a precise distance and directed to a particular point in space so that each sensor has a precisely defined focal point that must not change relative to the focal points of adjacent sensors. Even slight variations in the spatial separation of the sensors and the angular orientation of the sensors may lead to image artifacts introduced through a stitching process to stick multiple separate images taken by the sensors into a single panoramic frame.

SUMMARY

This Summary is provided to comply with 37 C.F.R. § 1.73, requiring a summary of the invention briefly indicating the nature and substance of the invention. It is submitted with the understanding that it will not be used to interpret or limit the scope or meaning of the claims.

In one aspect, there is provided a method for mounting an imaging sensor to a chassis. The method comprises forming a plurality of mounting formations on a body of the chassis: forming a plurality of sensor sub-assemblies, each comprising a sensor mounted to a cartridge block; and securing each sensor sub-assembly to the chassis via a corresponding mounting formation.

Other aspects of the invention will be apparent from the detailed description below.

BRIEF DESCRIPTION OF THE DRAWINGS

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

The present invention, in accordance with one or more various embodiments, is described in detail with reference to the following figures. The drawings are provided for purposes of illustration only and merely depict exemplary embodiments of the invention. These drawings are provided to facilitate the reader's understanding of the invention and shall not be considered limiting of the breadth, scope, or applicability of the invention. It should be noted that for clarity and ease of illustration these drawings are not necessarily made to scale.

The figures are not intended to be exhaustive or to limit the invention to the precise form disclosed. It should be understood that the invention can be practiced with modification and alteration, and that the invention be limited only by the claims and the equivalents thereof.

DETAILED DESCRIPTION

In the following description, for purposes of explanation, numerous specific details are set forth in order to provide a thorough understanding of the invention. It will be apparent, however, to one skilled in the art that the invention can be practiced without these specific details. In other instances, structures and devices are shown in block diagram form only in order to avoid obscuring the invention.

Reference in this specification to "one embodiment" or "an embodiment" means that a particular feature, structure, or characteristic described in connection with the embodiment is included in at least one embodiment of the invention. The appearance of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Moreover, although the following description contains many specifics for the purposes of illustration, anyone skilled in the art will appreciate that many variations and/or alterations to said details are within the scope of the present invention. Similarly, although many of the features of the present invention are described in terms of each other, or in conjunction with each other, one skilled in the art will appreciate that many of these features can be provided independently of other features. Accordingly, this description of the invention is set forth without any loss of generality to, and without imposing limitations upon, the invention.

Figure 1:
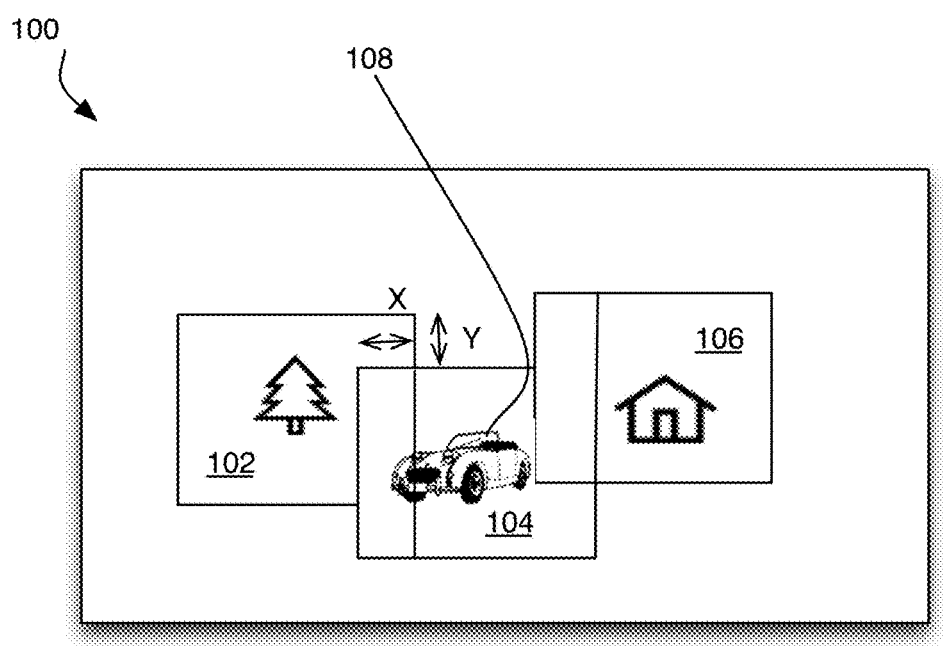
FIG. 1 illustrates the concept of a capture box, in accordance with one embodiment of the invention.

FIG. 1 illustrates the concept of a capture box, in accordance with one embodiment of the invention. Scene 100 comprises an area 102, an area 104, and an area 106. Each area 102 to 106 defines a 'capture box'. Each of the capture boxes is associated with a particular sensor of a panoramic camera. For example, the capture box 102 defines a capture area for a first sensor, the capture box 104 defines a sensor area for a second sensor, and the sensor box 106 defines a sensor area for a third sensor.

As will be seen, the capture box 104 overlaps the capture box 102 by a horizontal dimension 'X', and is offset vertically from the capture box 102 by a distance 'Y'. What the capture boxes are intended to show is that slight variations in the distances X, and Y will lead to improper alignment of any image in a region where the boxes overlap. For example, in the case of the capture boxes 102 and 104 it will be seen that an automobile 108 is located in the area of overlap between these boxes. Thus, variances in the distances X and Y will result in stitching artifacts across the automobile 108.

Any panoramic camera should support an opto-mechanical design that uses reduced instance-to-instance variation of X and Y offsets between capture boxes. Typically the variation in the X dimension, and the Y dimension should each be less than 300 micrometers, respectively. In order to achieve such tolerances, it is critical that the sensors within a camera housing be precision-mounted with very little variations in inter-camera distance and the angular placement of each camera relative to the housing.

Figure 2:
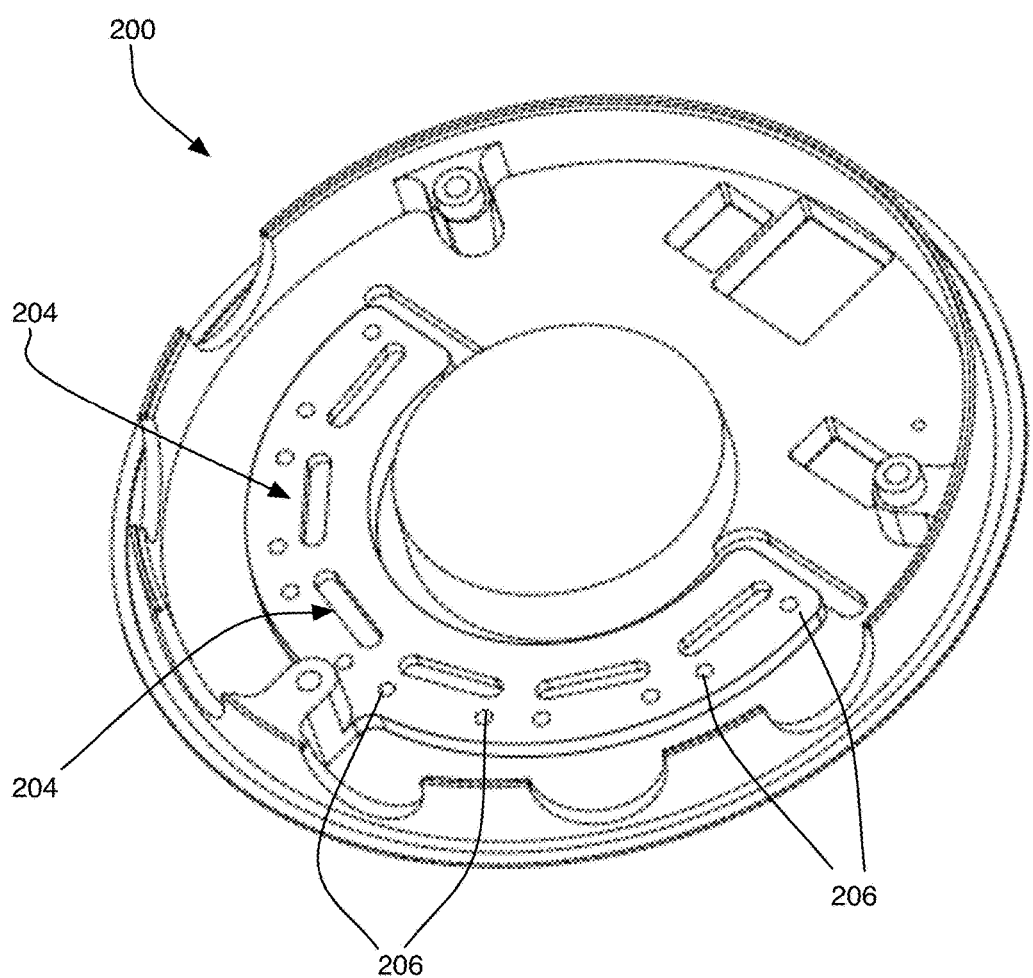
FIG. 2 shows a perspective view of a lower chassis, which forms part of a camera housing for a panoramic camera, in accordance with one embodiment of the invention.

FIG. 2 shows a perspective view 200 of a lower chassis, which forms part of a camera housing for a panoramic camera, in accordance with one embodiment of the invention.

The chassis 200 may be of aluminum and may be metal injection molded to include a plurality of arcuately separated slots 204. Each slot 204 is shaped and dimensioned to receive a matching anchor 230 (see FIG. 4) located on an operatively underside of a cartridge block (to be described).

Corresponding to each slot 204 there is a pair of holes or apertures 206, as can be seen from FIG. 2. The spatial position of each pair of holes 206 is precisely defined during the metal injection molding process.

Figure 3:
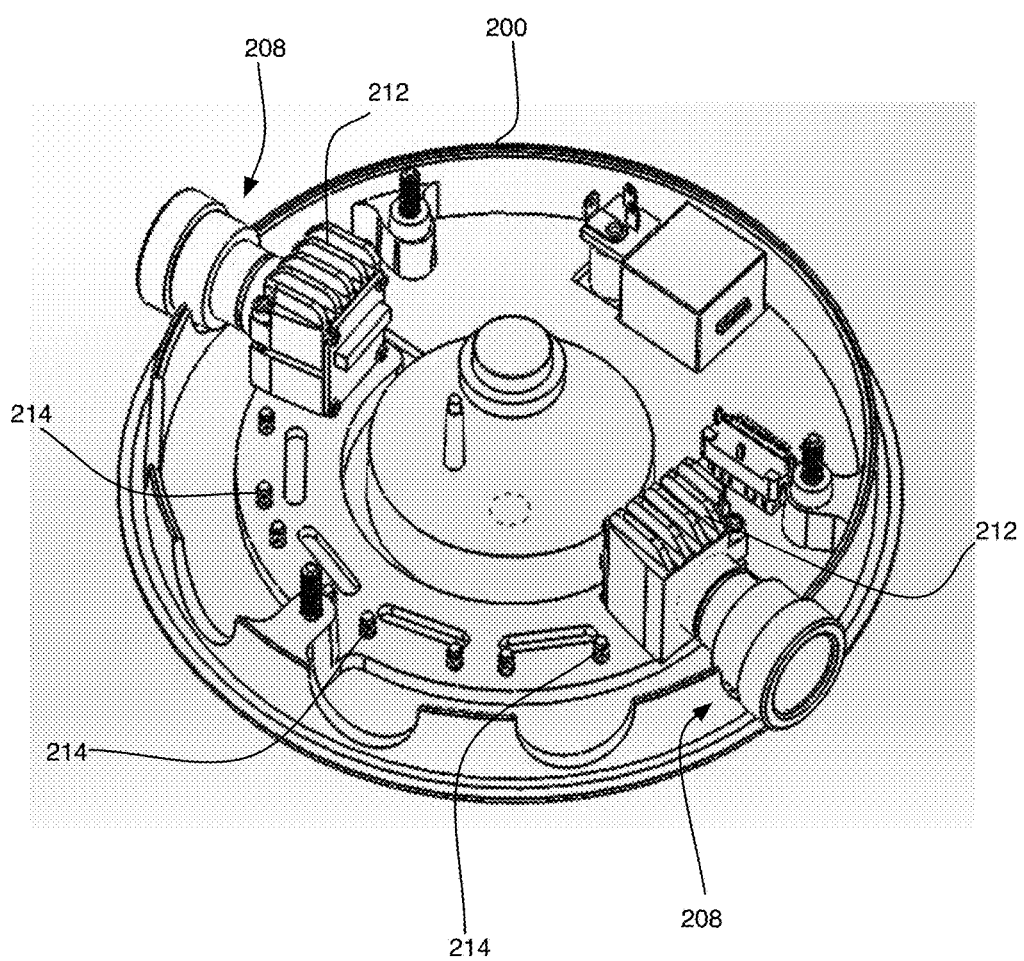
FIG. 3 shows the chassis of FIG. 2 with two sensor sub-assemblies mounted thereto, in accordance one embodiment of the invention.

FIG. 3 shows the chassis 200 with two sensor sub-assemblies indicated generally by reference 208 mounted thereto. Each sub-assembly 208 includes a lens portion 210, which is mounted within a cartridge block 212 as will be described later.

The cartridge block 212 is seated within a corresponding slot 204 so that its corresponding anchor 230 is seated snugly within the slot 204. Countersunk screw-threaded fasteners may then be used to secure each cartridge block to the chassis 200. Reference numeral 214 indicates the countersunk screws, in accordance with one embodiment. Advantageously, since the cartridge block is secured to the chassis 200 by means of countersunk screws, each cartridge 212 becomes self-aligned with the chassis 200 when the countersunk screws 214 are locked into position.

This self-alignment of each cartridge block relative to the chassis 200 means that there is little to no angular variation of each sub-assembly 208 when mounted to the chassis 200 in the manner described. It is yet a further advantage of the chassis 200 that it is metal injection molded rather than manufactured by computer numeric controlled machines. This is because the placement of the slots and holes of the chassis 200 can be very tightly controlled thus committing little or no variation of the X and Y dimensions (see FIG. 1) when the sub-assemblies 208 are mounted to the chassis 200.

Figure 4:
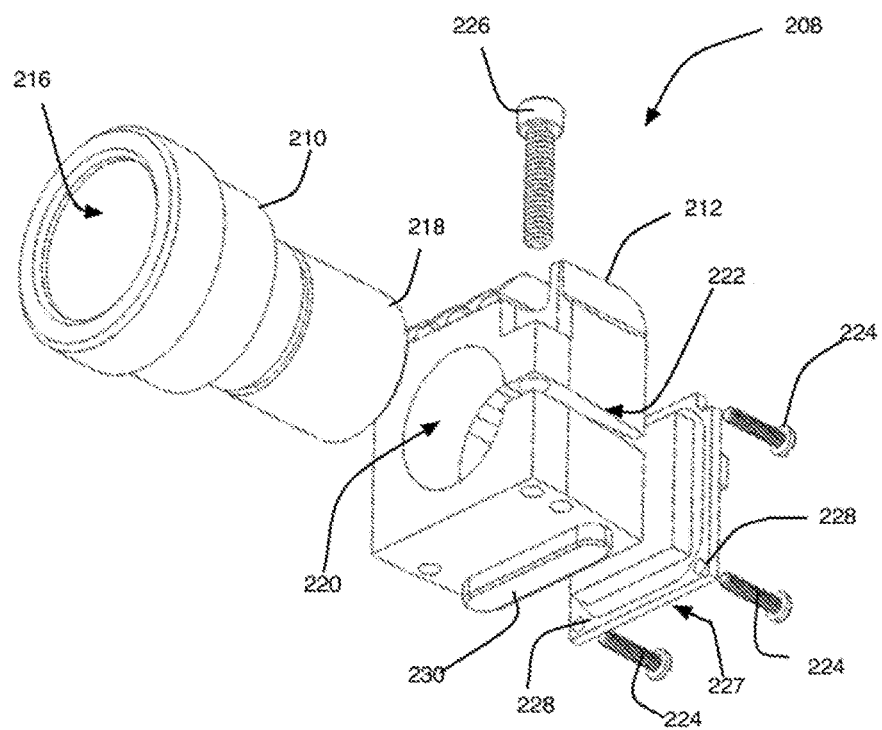
FIG. 4 shows an exploded three-dimensional view of a camera sub-assembly, in accordance with one embodiment of the invention.
Figure 5:
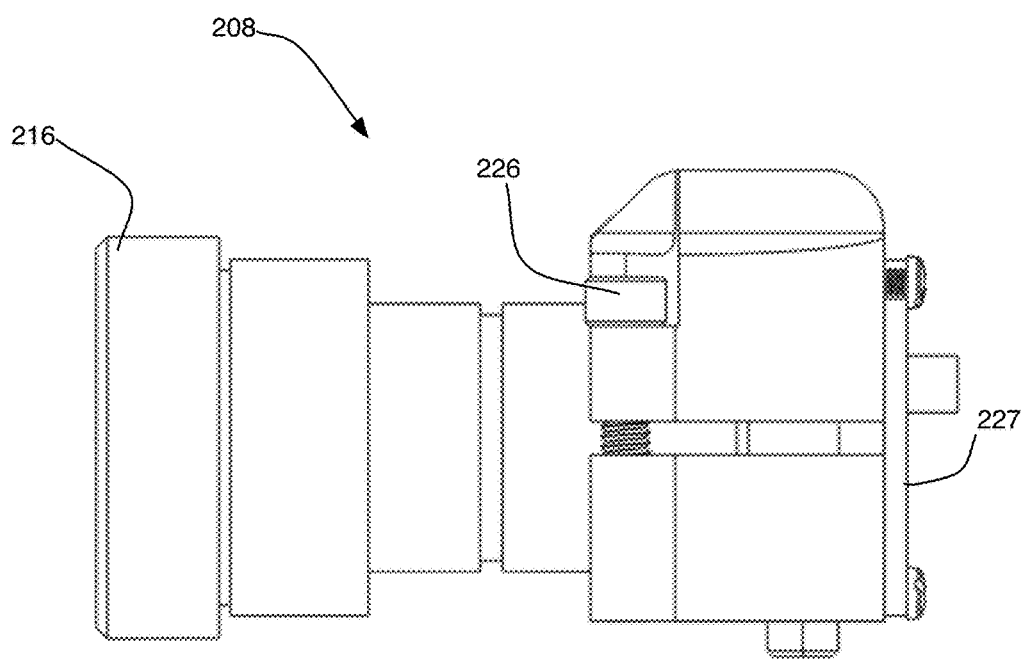
FIG. 5 shows a side view of the camera sub-assembly of FIG. 4.
Figure 6:
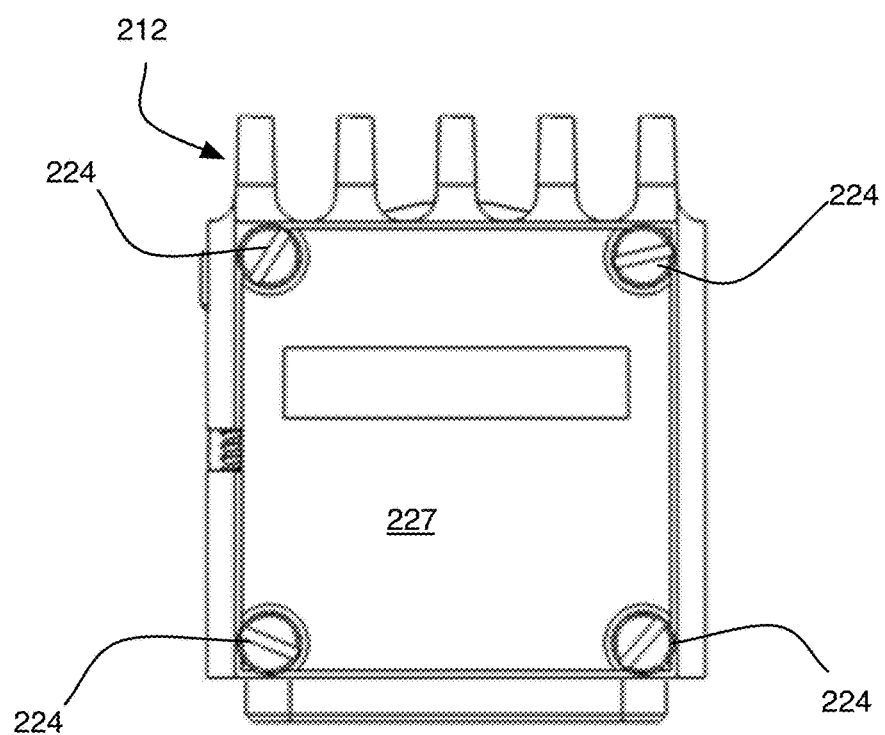
FIG. 6 shows a rear view of the camera sub-assembly of FIG. 4.

FIG. 4 shows an exploded three-dimensional view of the camera sub-assembly 208. As will be seen, the sub-assembly 208 comprises a lens portion 210 which includes a lens 216 mounted at a first end thereof. An end 218 that is remote from the lens 216 is shaped and dimensioned to be received within a corresponding aperture 220 formed in the cartridge 212.

It is to be noted that the aperture 220 is formed with a lateral slot 222 so that the relative size of the aperture 220 may be adjusted. For fastening purposes, a set-screw 226 is used to exert a crimping action on the anchor on the cartridge 212 thereby to cause the aperture 222 to be narrowed. The result is that the end 218 of the sensor portion is firmly gripped or retained within the slot 220.

To complete the sub-assembly 208, a printed circuit board (PCB) 227 is mounted to an end of the cartridge 212 by means of screw-threaded fasteners 226 as shown. Three of the screw threaded fasteners 226 engage complementary apertures 228 formed in the PCB 227, however one of the fasteners designated 226 engages an open notch 230 formed in the PCB 227. The notch 230 prevents warping or kinking of the PCB during the fastening process.

Although the invention is described above in terms of various exemplary embodiments and implementations, it should be understood that the various features, aspects and functionality described in one or more of the individual embodiments are not limited in their applicability to the particular embodiment with which they are described, but instead can be applied, alone or in various combinations, to one or more of the other embodiments of the invention, whether or not such embodiments are described and whether or not such features are presented as being a part of a described embodiment. Thus, the breadth and scope of the present invention should not be limited by any of the above-described exemplary embodiments.

Terms and phrases used in this document, and variations thereof, unless otherwise expressly stated, should be construed as open ended as opposed to limiting. As examples of the foregoing: the term "including" should be read as meaning "including, without limitation" or the like; the term "example" is used to provide exemplary instances of the item in discussion, not an exhaustive or limiting list thereof; the terms "a" or "an" should be read as meaning "at least one," "one or more" or the like; and adjectives such as "conventional," "traditional," "normal," "standard," "known" and terms of similar meaning should not be construed as limiting the item described to a given time period or to an item available as of a given time, but instead should be read to encompass conventional, traditional, normal, or standard technologies that may be available or known now or at any time in the future. Likewise, where this document refers to technologies that would be apparent or known to one of ordinary skill in the art, such technologies encompass those apparent or known to the skilled artisan now or at any time in the future.

The presence of broadening words and phrases such as "one or more," "at least," "but not limited to" or other like phrases in some instances shall not be read to mean that the narrower case is intended or required in instances where such broadening phrases may be absent. The use of the term "module" does not imply that the components or functionality described or claimed as part of the module are all configured in a common package. Indeed, any or all of the various components of a module, whether control logic or other components, can be combined in a single package or separately maintained and can further be distributed in multiple groupings or packages or across multiple locations.

Additionally, the various embodiments set forth herein are described in terms of exemplary block diagrams, flow charts and other illustrations. As will become apparent to one of ordinary skill in the art after reading this document, the illustrated embodiments and their various alternatives can be implemented without confinement to the illustrated examples. For example, block diagrams and their accompanying description should not be construed as mandating a particular architecture or configuration.

The invention claimed is:

1. A method for mounting an imaging sensor to a chassis, comprising:

forming a plurality of arcuately spaced slots in a body of the chassis; and forming a plurality of sensor sub-assemblies, each of the plurality of sensor sub-assemblies comprising a sensor mounted to a cartridge block, wherein each of said cartridge blocks comprises an anchor formation which is shaped and dimensioned to fit into one of said arcuately spaced slots for securing each said sensor sub-assembly to the chassis; and forming a pair of apertures associated with each of said arcuately spaced slots, wherein the cartridge block of each of the plurality of sensor sub-assemblies is secured to the chassis by fastening countersunk fasteners through each of the pair of apertures in order to secure the cartridge blocks to the chassis, wherein each of the plurality of sensor sub-assemblies include a lens portion, wherein one end of the lens portion is horizontally inserted into an aperture in the respective cartridge block, and wherein the one end of the lens portion is secured in the aperture by fastening a set-screw in the cartridge blocks in order to narrow a size of the aperture and crimp the lens portion into said aperture.

2. The method of claim 1, wherein each slot is fabricated via a metal injection molding process.

3. The method of claim 1, wherein forming the sensor sub-assembly comprises securing a printed circuit board (PCB) to an end of the cartridge block for the sub-assembly.

4. The method of claim 3, wherein said securing of the PCB to the cartridge block comprises preventing warping of the PCB by cutting a notch in at least one second aperture formed in the PCB thereby to allow the lateral displacement of PCB relative to a through axis of said second aperture.

5. A chassis for a multiple-sensor panoramic camera, comprising:

a body formed with a plurality of arcuately spaced slots shaped and dimensioned to receive an anchor of a cartridge assembly therein for securing each sensor sub-assembly from a plurality of sensor sub-assemblies to the chassis;

a pair of matching apertures associated with each of the slots, wherein the cartridge assembly of each of the plurality of sensor sub-assemblies is secured to the chassis by fastening countersunk fasteners through each of the pair of apertures in order to secure the cartridge assembly to the chassis, wherein each of the plurality of sensor sub assemblies include a lens portion, wherein one end of the lens portion is horizontally inserted into an aperture in the cartridge assembly, and wherein the one end of the lens portion is firmly secured in the aperture by fastening a set-screw in each of the plurality of cartridge assemblies in order to narrow a size of the aperture and crimp the lens portion into said aperture.

6. The chassis of claim 5, made by a metal injection molding process.

7. The chassis of claim 6, wherein the chassis is of aluminum.

8. The chassis of claim 5, wherein each slot is positioned relative to its neighbor to position of less than 300 micrometers.

9. A panoramic camera, comprising:

a chassis which includes a body formed with a plurality of arcuately shaped slots and a pair of matching apertures associated with each slot;

at least one sensor sub-assembly from a plurality of sensor sub-assemblies mounted to the body of the chassis, each via an anchor that is seated into one of said slots for securing each of the sensor sub-assembly to the body of the chassis, wherein each of the sensor sub-assembly comprises a sensor mounted to a cartridge block, wherein said cartridge block comprises the anchor, wherein the cartridge block of each of the plurality of sensor sub-assemblies are secured to the body of the chassis by fastening countersunk fasteners through each of the pair of apertures in order to secure the cartridge block of each of the plurality of sensor sub-assemblies to the chassis, wherein each of the plurality of sensor sub-assemblies comprises a lens portion which is mounted to the cartridge block by horizontally inserting one end of the lens portion into an aperture in the cartridge block, and wherein the one end of the lens portion is firmly secured in the aperture by fastening a set-screw in the cartridge block in order to narrow a size of the aperture and crimp the lens portion into said aperture.

10. The panoramic camera of claim 9, wherein the chassis is made by a metal injection molding process.

11. The panoramic camera of claim 10, wherein the chassis is of aluminum.

12. The panoramic camera of claim 9, wherein each slot is positioned relative to its neighbor to position of less than 300 micrometers.

* * * * *